Figure 1:
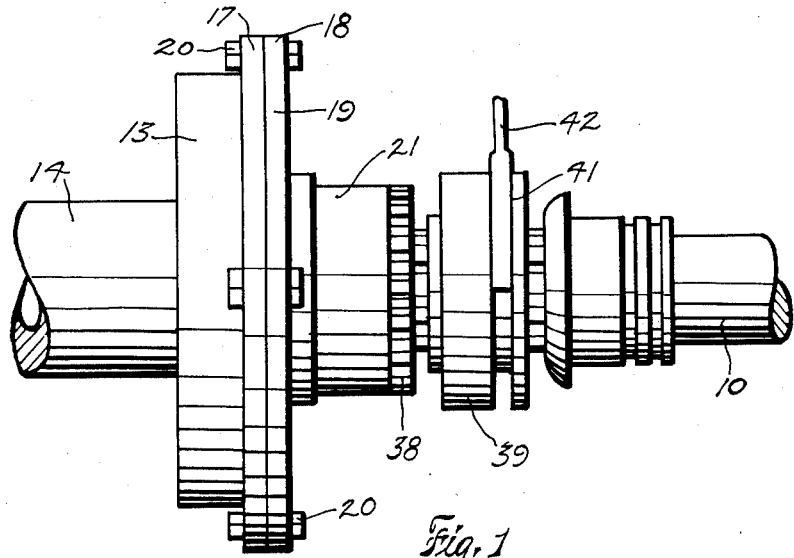

April 17, 1934.   W. R. MILLICAN   1,955,200
ROTARY CLUTCH
Filed Nov. 13, 1931   4 Sheets-Sheet 1

Inventor
Ward R. Millican

By Jack A. Schley
Attorney

April 17, 1934.　　　W. R. MILLICAN　　　1,955,200

ROTARY CLUTCH

Filed Nov. 13, 1931　　4 Sheets-Sheet 2

Inventor
Word R. Millican

By Jack A. Ashley
Attorney

April 17, 1934.  W. R. MILLICAN  1,955,200
ROTARY CLUTCH
Filed Nov. 13, 1931  4 Sheets-Sheet 3

Inventor
Word R. Millican
By Jack A. Ochley
Attorney

April 17, 1934.  W. R. MILLICAN  1,955,200
ROTARY CLUTCH
Filed Nov. 13, 1931   4 Sheets-Sheet 4

Inventor
Word R. Millican
By
Jack A. Schley
Attorney

Patented Apr. 17, 1934

1,955,200

UNITED STATES PATENT OFFICE 1,955,200

ROTARY CLUTCH

Word R. Millican, Parsons, Kans., assignor of one-half to Christine Millican, Dallas, Tex.

Application November 13, 1931, Serial No. 574,717

5 Claims. (Cl. 192—46)

This invention relates to new and useful improvements in rotary clutches.

The invention has particularly to do with the over-riding type of clutch, wherein the driven clutch member is permitted to rotate freely when the driving clutch member is disengaged therefrom.

One object of the invention is to provide an improved clutch of the over-riding type wherein positive interlocking or meshing of the clutching parts is provided instead of mere frictional or wedging contacts. The advantage of such an arrangement is that undue wear is eliminated and a quick clutching action with substantially no lost motion is effected.

A particular object of the invention is to provide a clutch of the over-riding type employing a plurality of clutching members arranged to be operated in common and simultaneously so that all clutching members will positively engage or mesh with the driven member, thus assuring maximum efficiency, as well as maximum clutching action, and preventing failure of one or more of the clutching elements, thus doing away with slippage or unequalized clutching action. Such an arrangement makes for maximum efficiency at all speeds and under all loads.

Another object of the invention is to provide an improved clutch of the over-riding type which will be simple in construction and which may be constructed at a low cost, as well as one in which the parts will be subjected to a minimum wear and positive engagements, thus making for long life. The advantage of such an arrangement is that a comparatively small number of parts are required and owing to the simplicity of the structure its working parts may be made readily accessible. Also by eliminating frictional contact and utilizing positive mechanical engagement slippage and the wear resulting therefrom are substantially eliminated.

A still further object of the invention is to provide an improved clutch of the over-riding type which will operate in ordinary lubricating oil, thus eliminating the special grade of oil usually required for clutches of this type. This is particularly possible because of the elimination of frictional engagement between the clutching parts and there is no chance of slippage.

A very important object of the invention is to provide a clutch of the over-riding type which will be quick and positive in its operation, thus eliminating the time element between the applying of the clutch and the clutching engagement, as well as doing away with unnecessary travel of the clutching parts and sluggishness in action.

A further object of the invention is to provide an improved shifting and locking device, whereby the parts may be locked against operation and the over-riding feature eliminated, and also whereby engagement of the locking elements will be assured upon shifting of the actuating means without waiting to mesh the interlocking parts.

Still another object of the invention is to provide a clutch of the over-riding type having shiftable clutch members arranged to operate in reverse directions so that the driving means can be reversed and the over-riding feature utilized when the driving means is operated in either direction.

A construction designed to carry out the invention will be hereinafter described together with other features of the invention.

Figure 2:
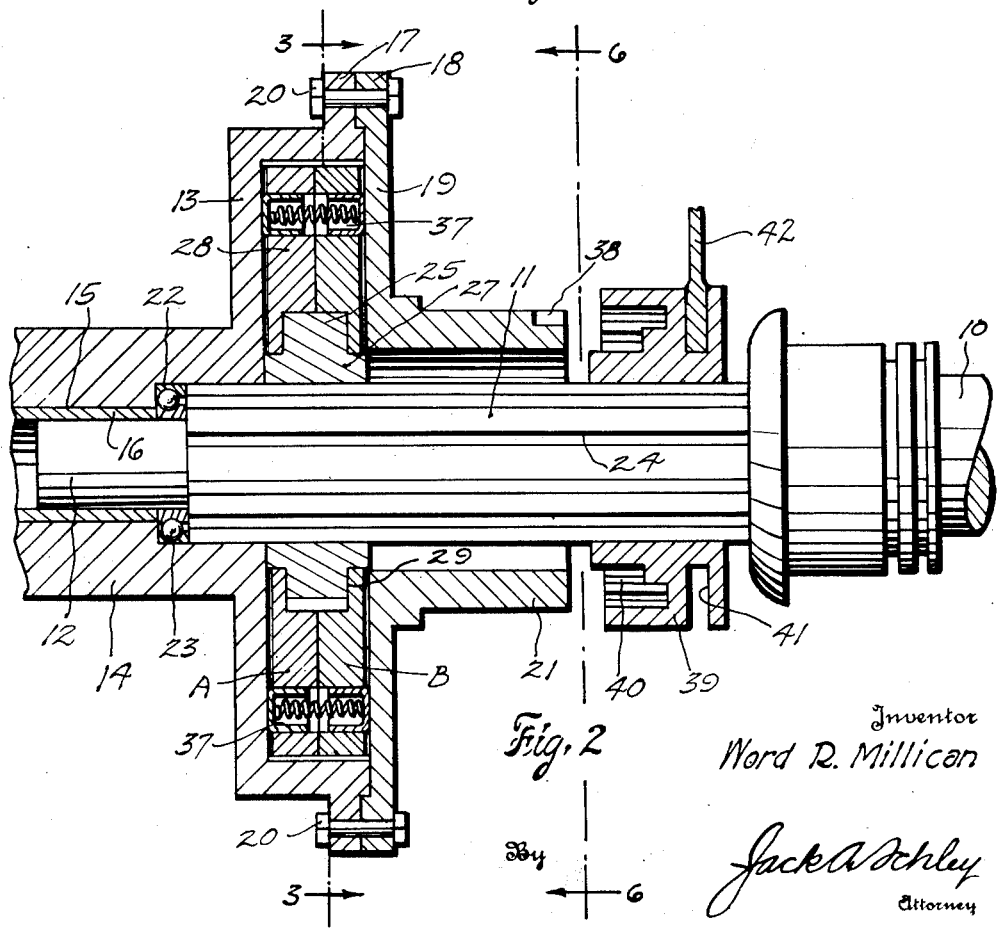
Figure 3:
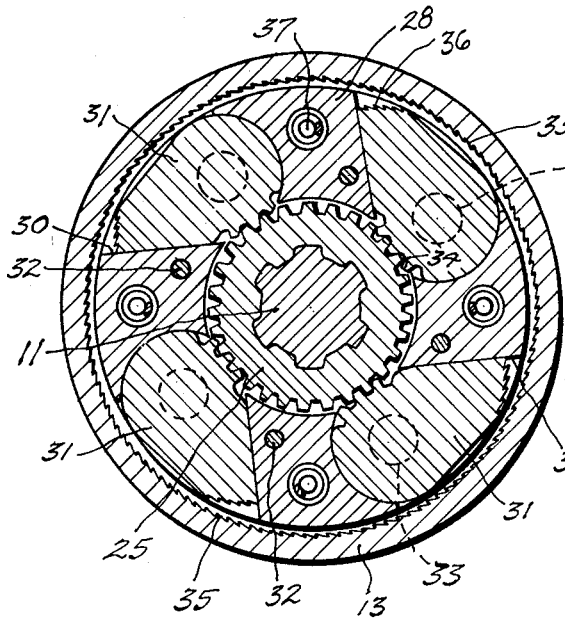
Figure 4:
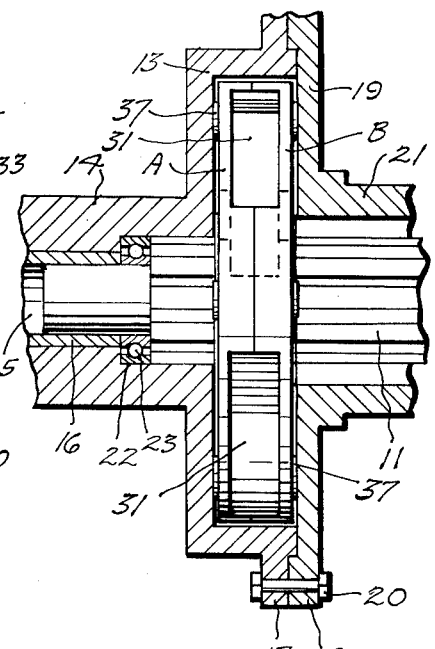
Figure 5:
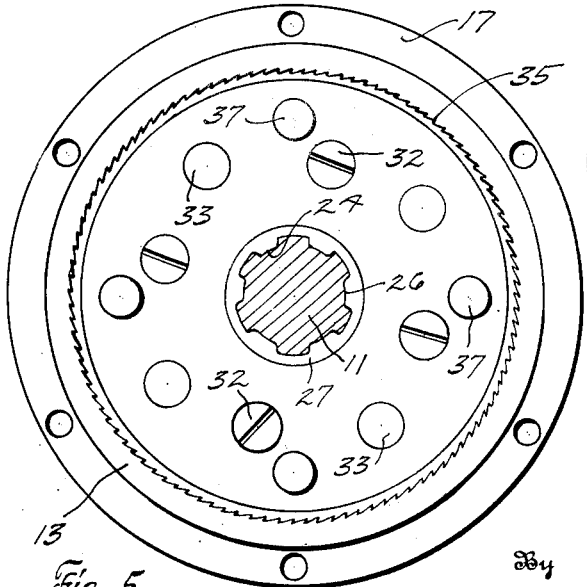
Figure 6:
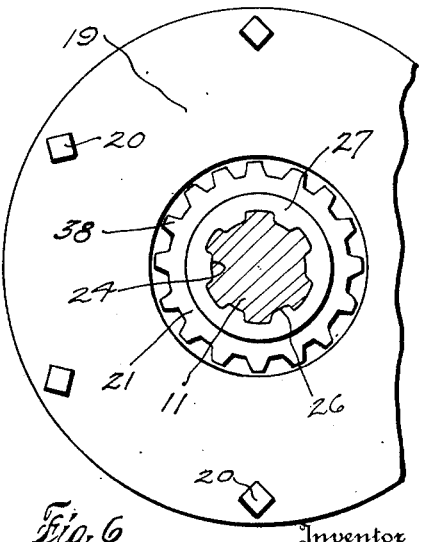
Figure 7:
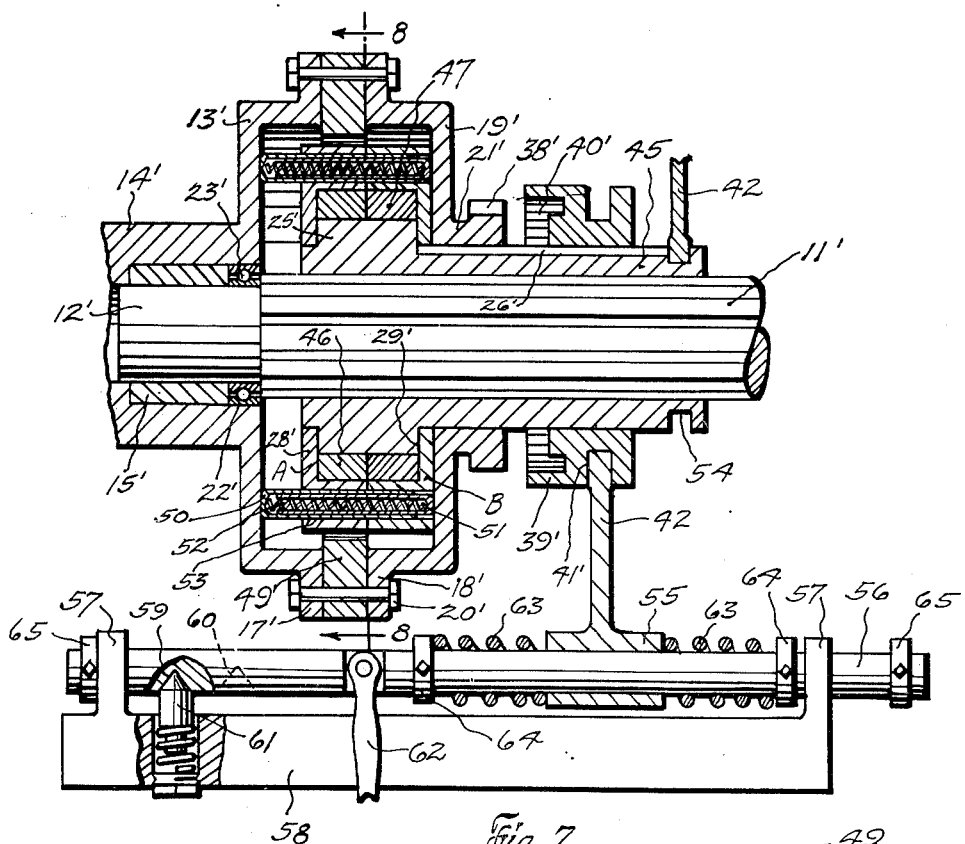
Figure 8:
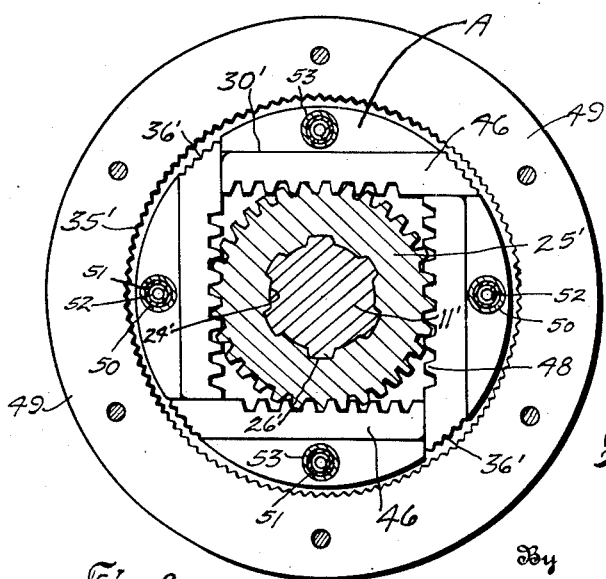
Figure 9:
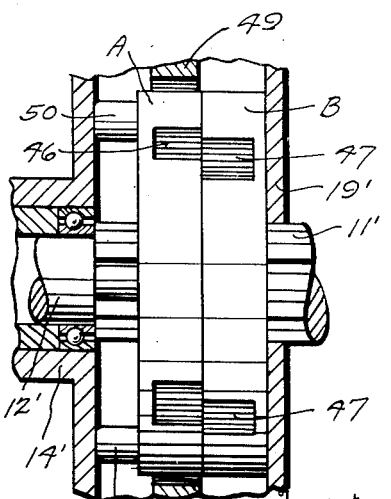
Figure 10:
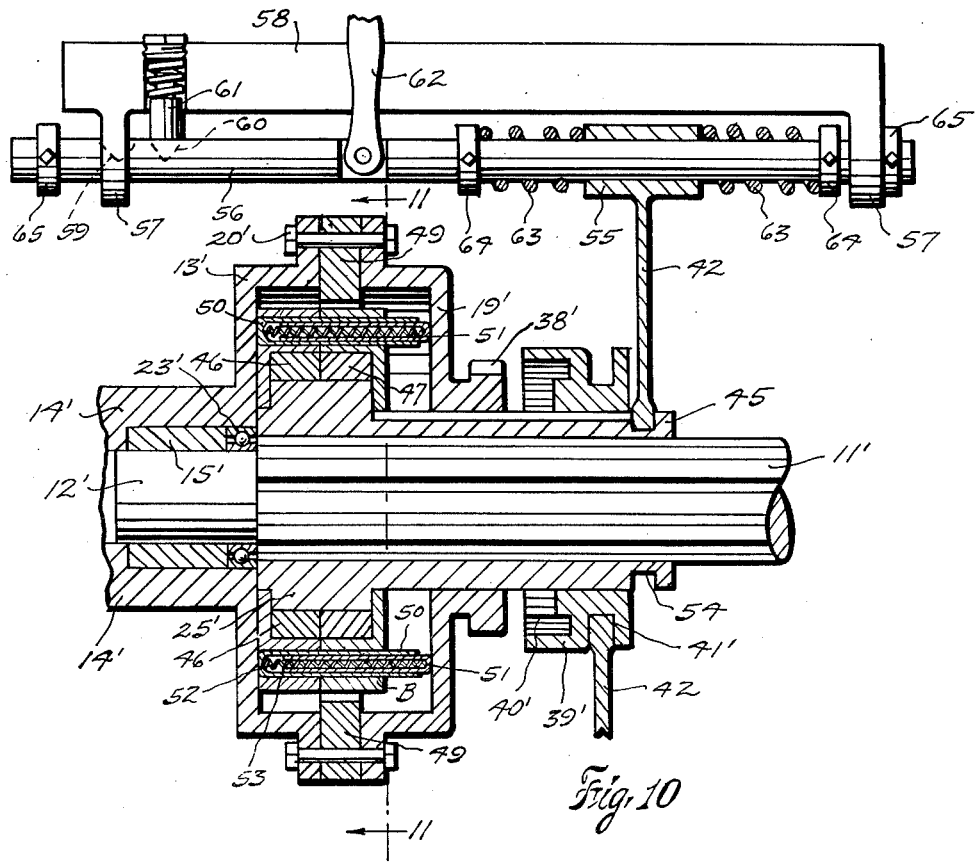
Figure 11:
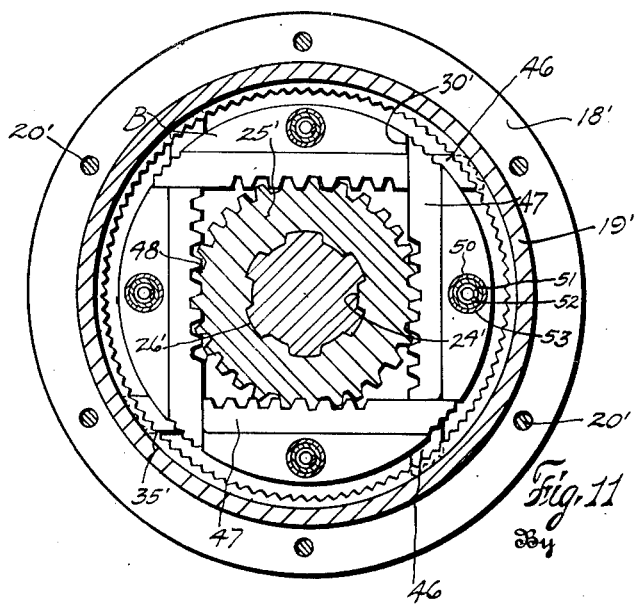

The invention will be more readily understood from a reading of the following specification and by reference to the accompanying drawings in which an example of the invention is shown, and wherein:

Figure 1 is a side elevation of a clutch constructed in accordance with the invention, Figure 2 is a longitudinal sectional view of the same, Figure 3 is a transverse sectional view taken on the line 3—3 of Figure 2, Figure 4 is a view showing the driven member in section and the driving member in elevation, Figure 5 is an elevation showing the cover plate removed and the drive shaft in section, Figure 6 is a sectional view taken on the line 6—6 of Figure 2, Figure 7 is a view similar to Figure 2 showing a reversing type of clutch, Figure 8 is a transverse sectional view taken on the line 8—8 of Figure 7, Figure 9 is a detail showing a portion of the driven member in section and the driving member in elevation, Figure 10 is a view similar to Figure 7 showing the parts shifted for a reverse drive, and Figure 11 is a transverse sectional view taken on the line 11—11 of Figure 10.

In the drawings the numeral 10 designates a drive shaft which may be connected with any source of power, such as the engine of a motor vehicle, or with any other driving medium where it is desired to use a clutch of this type. The shaft is provided with a shank 11 and a reduced trunnion 12 on the end of the shank. A housing 13 surrounds the shank and has a hub 14 provided with a reduced bore 15 fitted with a bushing 16, which forms a bearing for the trunnion 12. The housing is cylindrical and has an outwardly directed annular flange 17 for receiving the complementary flange 18 of a circular cover plate 19. Bolts 20 are employed to secure the cover on the housing. A hub 21 surrounding the shank 11 extends from the cover plate.

The hub 14 is shouldered at 22 and receives a ball bearing assembly 23, which surrounds the trunnion 12 and takes the end thrust of the shank. The parts are suitably mounted as in a transmission case (not shown), whereby longitudinal displacement of the shaft from the housing and its cover are prevented. The housing 13 constitutes the driven member and it may be suitably connected with a transmission or other mechanism which it is desired to drive and which carries the driven load.

The shank 11 is fluted whereby it is formed with longitudinal keyways or grooves 24. A gear 25 confined within the housing has keys or lugs 26 in the bore of its hub 27 engaging in the keyways 24, thus when the shank 11 is rotated by its shaft 10 the gear 25 will likewise be rotated. A circular clutch head 28 is mounted on the hub of the gear and is formed into two complementary sections A and B. These sections are formed with central recesses 29 for receiving the gear and radial recesses or pockets 30 for receiving dogs 31, the pockets extending from the recesses 29 to the outer periphery of the head. The sections of the housing are held together by machine screws 32, or in any other suitable manner.

Each dog 31 is provided with trunnions 33 journaled in the sections of the head, so as to permit the dog to swing into and out of its pocket. Each dog is provided with a gear segment 34 meshing with the teeth of the gear 25 and thus when the gear 25 is rotated the dogs are swung.

The housing 13 is provided with an internal toothed ring 35 and each dog 31 is provided on its outer end with teeth 36 adapted to engage in the teeth of the ring 35. The teeth of the ring and of the dogs are of the ratchet type so that they will engage when moved in one direction and slip over each other when moved in the opposite direction. When the dogs are swung within their pockets, as shown in Figure 3, they will be within the periphery of the clutch head 28 and the clutch head and housing 13 will be free to rotate independently of each other, but when said dogs are swung outwardly their teeth 36 will engage the teeth of the ring 35. When the teeth are in engagement, rotation of the head 28 (Figure 3) in a counter-clockwise direction will cause the housing 13 to be rotated in the same direction. Should the housing 13, which is the driven member, gain sufficient momentum to rotate faster than the driving head 28, then the teeth of the ring 35 will slip over the teeth 36 and force the dogs 31 inwardly. This will be accomplished because of the freedom of the head 28 to rotate.

It will be appreciated that the head 28 is full-floating and its operation is limited only by the swing of the dogs 31. It is obvious that in order to swing the dogs some means must be provided for holding the head against rotation, and to accomplish this spring plungers 37 are mounted in the head so as to engage the inner side faces of the housing and the cover plate 19, as is best shown in Figures 2 and 4. This frictional contact is sufficient to hold the head against rotation while the dogs are being actuated.

The hub 21 of the cover plate 19 is provided with a ring of integral teeth 38. A locking collar 39 slidably mounted on the shank 11 has an internal toothed socket 40 for receiving the teeth 38. The collar 39 is provided with an annular groove 41 for receiving the yoke 42 of a shifting device, which will be hereinafter described, whereby said collar may be slid to engage its teeth 40 with the teeth 38. It will be seen that the shank 11 being integral with the drive shaft 10 and the hub 21 being attached to the housing 13, constitute the driving and driven members of the clutch. When the collar is in the position shown in Figures 1 and 2, motion from the shank 11 must be transmitted to the housing 13 by means of the dogs 31 and the gear 25, but when the collar is shifted to engage the teeth 38, then a rigid driving connection is established between the shank 11 and the housing 13 and the overriding clutch is eliminated so far as the operation is concerned.

In operating the clutch the shaft 10 is attached to a source of power and the hub 14 of the housing 13 is connected to the part to be driven. For the purpose of illustration, it may be assumed that the shaft 10 is connected with the usual clutch of a motor vehicle, while the housing 13 and hub 14 are connected with the transmission of the motor vehicle, neither the clutch nor the transmission being illustrated. With the parts in the position shown in Figures 1 and 2, motion imparted to the shaft 10 will rotate the shank 11 and the gear 25. Normally the dogs 31 will be confined within the pockets 30 of the housing 28, but when rotation is imparted to the gear 25 in a counterclockwise direction (Figure 3) the dogs will be swung outwardly and their teeth 36 caused to engage in the teeth 35 of the housing 13. It is pointed out that this operation will be quick and positive and with a minimum of lost motion.

The initial movement of the shank 11 will impart rotation to the gear and the dogs will be immediately swung outward. The travel of the dogs will be but a small fraction of an inch in the ordinary device, and the clutching will be substantially instantaneous. Further, each dog will be moved exactly the same distance and exactly at the same time so that the clutching action will be equalized and positive and each dog will engage as effectually as each other dog. This will prevent slipping and will assure balance. When the dogs are swung the head 28 will be held against rotation relatively of the housing 13 by the spring plungers 37.

It will be seen that so long as the shank 11 and the housing 13 are rotated at the same rate of speed the clutch will remain engaged. However, should the speed of the shaft 10 be suddenly reduced or entirely cut off, the momentum of the housing 13 would cause it to continue to rotate and the teeth 35 would pull out of the teeth 36 and at the same time the housing 13 would tend to rotate the head 28, because of the spring plungers 37, and the gear 25 rotating at a lower rate of speed would swing the dogs 31 into their pockets. When this was accomplished the frictional lock between the plungers and the housing would be broken and the housing would continue to rotate faster than the head 28. The same action would take place if during the driving operation the housing 13 built up a momentum whereby it would rotate at a higher rate of speed than that at which the shaft 10 was being driven. But the instant the rates of speed were equalized the clutch would become effective.

It is obvious that the invention may be carried out in numerous ways so long as the same principle of a plurality of dogs or clutching elements operated by a common actuator and engaging a toothed ring, is employed. In further illustrating the invention, I have shown in Figures 7 to 11 inclusive a structure wherein two sets of clutching dogs are employed and the parts are shiftable to give reverse operations.

The shank 11' is elongated and the housing comprises two members 13' and 19', the latter corresponding to the cover member 19. The trunnion 12' of the shank engages in the bushing 15' of the hub 14' of the housing and a bearing 23' engaging the shoulder 22' sustains the end thrust of the drive shank. The housing member 19' has a short hub 21' provided with teeth 38' engaging in the socket 40' of a locking collar 39'. The drive shank 11' is connected with the driven shaft of a transmission, and thus is subject to rotation in reverse directions.

A gear 25' is mounted on the shank and is provided with an elongated hub sleeve 45 made integral therewith and rotatable within the hub 21'. This sleeve extends beyond and is splined to the collar and in its bore is provided with longitudinal keys or ribs 26' engaging in the grooves or keyways 24' of the shank. The gear and the sleeve are thus caused to rotate with the shank, but may be moved longitudinally of the shank within the housing. The gear is confined within a circular clutch head 28' made in sections A and B, similar to the sections of the head 28. The sections of the head are each provided with a substantially square central recess 29' and recesses or slots 30' extending tangentially therefrom, one side of each slot being flush with one of the sides of the central recess. Rack bars 46 and 47 are mounted in the recesses and the slots, the bars 46 being mounted in the section A and the bars 47 being mounted in the section B. The bars 46 have sliding contact with the bars 47 and each bar is provided with teeth 48 engaging the teeth of the gears 25', which is made wide enough to receive both sets of bars.

A ring 49 is secured between the flanges 17' and 18' of the housing members by bolts 20'. The ring extends a short distance into the housing and is provided on its inner periphery with teeth 35'. The teeth 35' are V-shaped so as to have equally inclined faces and are thus different from the ratchet teeth 35. On one end of each of the bars 46 and 47 teeth 36' are formed. These teeth are complementary to the teeth 35' so as to engage therein. It is pointed out that the ring 49 has a width substantially the same as that of one of the bars, and consequently when one set of bars is engaged with the ring the other set is free from engagement therewith.

It will be observed that the teeth 36' are on the opposite end of each bar 46 from the teeth 36' of its correlated bar 47. By reason of the V-shape of the teeth, either bar may be engaged with the ring 49. The relation of the bars will be apparent from Figures 8, 9 and 11, and the shifted positions for reversing the clutching engagement are set forth in Figures 7 and 10. In Figure 7 the bars 46 are in position to engage the ring 49, while in Figure 10 the bars 47 are in position to engage said ring.

In order to frictionally hold the head 28' against independent rotation, telescoping plungers 50 and 51 are provided. These plungers are extended by an internal coiled spring 52. The head 28' is provided with apertures 53 through which the plungers 50 extend and whereby the head may be slid laterally without interfering with the frictional contacts of said plungers. The plungers are located outwardly of the rack bars and act in a like manner to the plungers 37. It is obvious that any ordinary lubricating oil or liquid lubricant may be used in either of the housings herein described and no special grade of lubricant is required.

The structure illustrated in Figures 7 to 11 inclusive, is particularly adapted for motor vehicles or other transmissions where a reverse drive is employed. Referring to Figures 7 and 8, it will be seen that when the shank 11' is rotated in a clockwise direction the bars 46 of the section A of the clutch head will be slid or projected and the teeth 36' engaged with the teeth 35' of the ring 49. This will impart rotation to the housing 13 and if the housing gains momentum or if the speed of the shank 11' is reduced below the momentum of said housing, said housing will over-ride the clutch bars and they will be retracted the same as the dogs 31.

As before stated, the shank 11' is connected with a transmission or with a reversing drive so that said shank may be driven in either direction. When it is driven in one direction the bars 46 are utilized to clutch with the ring 49, the parts being in the position shown in Figure 7. When the rotation of the shank 11' is reversed it is necessary to shift the head 28' so as to bring the bars 47 into clutching relation with the ring 49, as is shown in Figure 10. The bars 47 working oppositely to the bars 46 will be forced outwardly when the gear 25' is rotated in a counterclockwise direction, as will be evident from Figure 11. In either form the bars will be retracted into the head when the speed of rotation of the shank 11' drops or the momentum of the housing 13' increases. This will be due to the temporary rotation of the head 28' by the housing due to the frictional contact of the plungers. This arrangement will provide a reversible overriding clutch.

While the lock collars 39 and 39' and the sleeve 45 may be slid by any suitable mechanism, I prefer to employ the structure illustrated in Figures 7 and 10. The yoke 42 may engage with the groove 41 in Figures 1 and 2, the groove 41' in Figures 7 and 10, or a groove 54 in the sleeve 45. Therefore, a description of one shifting device will be sufficient for all.

The yoke 42 is connected with a sleeve 55 which is slidably mounted on a shifting bar 56. The bar is mounted to slide in the ears 57 of a bracket 58, which is suitably fastened in place. The bar 56 has a pair of notches 59 and 60 in the path of a spring-pressed plunger 61 mounted in the bracket. The plunger engaging in these notches serves to hold the bar in its shifted positions. The bar is shifted by means of a lever 62 suitably mounted for convenient operation. The lever may be of any type and located wherever necessary.

Coiled springs 63 surrounding the bar 56 on each side of the sleeve 55 are confined between each end of the sleeve and collars 64 fastened on said bar. The longitudinal travel of the bar is limited by collars 65 fastened on its ends and alternately engaging the ears 57. The springs 63 yieldably hold the sleeve 55 in a central position between the collars 64 and at the same time either spring will yield so as to permit a sliding movement of the sleeve on the bar.

When the bar 56 is shifted to the left (Figure 7), the plunger 61 will ride out of the notch 59 and engage in the notch 60, the shifting movement to the left being limited by the engagement of the collar 65 with the right hand ear 57. This movement will shift the collar 39' for the purpose of receiving the teeth 38' in the socket 40'. Should the teeth of the socket abut the teeth 38' and not mesh therewith when the shift was made, the right hand spring 63 would be compressed and as soon as the parts rotated the teeth into meshing relation, the compressed spring would expand and thus shift the collar into locking position. By this arrangement it would not be necessary for the operator to retain his hold on the lever 62 and wait for the meshing of the teeth. In Figure 10 the same shifting mechanism is illustrated for shifting the sleeve 45, and as it is a duplicate of that shown in Figure 7 further description is considered unnecessary.

Various changes in the size and shape of the different parts, as well as modifications and alterations, may be made within the scope of the appended claims.

Having illustrated and described preferred forms of the invention, what I claim, is:

1. In a rotary clutch, a driven member having teeth, a driving member, a circular clutch head having a central recess and radial pockets, a gear mounted in the recess of the head and connected with the driving member, dogs pivoted in the pockets of the head and having teeth on their outer ends, gear segments on the dogs engaging the gear, the teeth of the driven member being located in the path of the teeth of the dogs, and frictional contact means carried by the head and engaging the driven member.

2. In a rotary clutch, a driving member, a driven housing having an internal ring of teeth, a clutch head mounted within the housing, a plurality of clutching elements carried by the head and having teeth for engaging the teeth of the driven member, the clutching elements being arranged in sets, means for shifting the head to engage either of the sets of clutching elements with the teeth of the housing, and means actuated by the driving member for operating the clutching elements.

3. In a rotary clutch, a cylindrical housing, a hub extending from the housing, an internal toothed ring on the inner periphery of the housing, a clutch head comprising sections having complementary recesses extending radially of the head, a driving shaft extending through the hub into the housing, a gear in the head surrounding the shaft and driven thereby, and clutching elements having teeth on their outer ends for engaging the toothed ring and movable in the recesses of the head, said elements having gear teeth on their inner ends engaging the gear.

4. In a rotary clutch, a cylindrical housing, a hub extending from the housing, an internal toothed ring on the inner periphery of the housing, a clutch head comprising sections having complementary recesses, each housing having one of its recesses located at its center and the others extending radially therefrom, a driving shaft extending through the hub and into the center recesses of the head, a gear in the center recesses of the head surrounding the shaft and driven thereby, and clutching elements having teeth on their outer ends for engaging the toothed ring and movable in the radial recesses of the head, said elements also having gear teeth in engagement with said gear.

5. In a rotary clutch, a cylindrical housing including an outwardly directed annular flange and a circular cover plate fastened to said flange, a hub extending axially from the cover plate, a toothed ring on the inner periphery of the housing, a clutch head comprising two sections having internal recesses, a gear confined in the recesses of the head, clutching elements confined in the recesses of the head having teeth on their outer ends for engaging the toothed ring, said gear in the recesses of the head being in constant mesh with the elements, a driving shaft extending through the hub and engaging in the gear, and spring pressed plungers mounted in the head between the recesses and frictionally engaging the housing and the cover plate thereof.

WORD R. MILLICAN.